J. H. BESANT. & M. B. ATKINSON
Improvement in Corn Harvesters.
No. 124,661. Patented March 19, 1872.
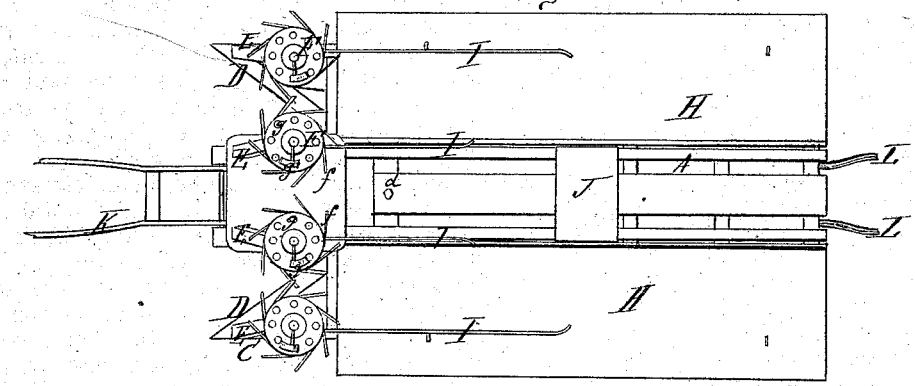
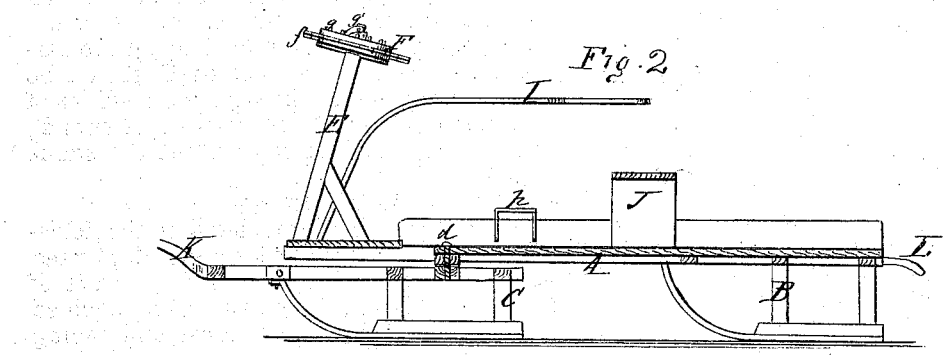

124,661

UNITED STATES PATENT OFFICE.

JAMES H. BESANT, OF POINT OF ROCKS, MARYLAND, AND MAHLON B. ATKINSON, OF GEORGETOWN, DISTRICT OF COLUMBIA.

IMPROVEMENT IN CORN-HARVESTERS.

Specification forming part of Letters Patent No. 124,661, dated March 19, 1872; antedated February 29, 1872.

*To all whom it may concern:*

Be it known that we, M. B. ATKINSON, of Georgetown, D. C., and JAS. H. BESANT, of Point of Rocks, Frederick county, Maryland, have invented a new and valuable Improvement in Corn-Harvesters; and we do hereby declare that the following is a full, clear, and exact description of the construction and operation of the same, reference being had to the annexed drawing making a part of this specification, and to the letters and figures of reference marked thereon.

Figure 1 of the drawing is a representation of a plan view of our invention. Fig. 2 is a vertical longitudinal section of the same.

This invention has relation to an improved corn-harvester; and consists in the construction and novel arrangement of devices which are designed for the purpose of cutting the corn-stalks, gathering them on hinged platforms, and depositing them on the ground out of the way of the harvester.

In the accompanying drawing illustrating this invention, A indicates a rectangular frame, arranged horizontally. B represents a sled secured rigidly to the rear end of the frame A. C represents a sled secured to the forward part of the frame by means of a vertical pivot, $d$, enabling the sled to be swung around in turning the harvester. This sled is provided with a pair of obliquely-placed knives, D, to cut the stalks as the harvester is drawn along. These knives are grooved sickle-wise on their upper sides. E E represent inclined standards rising from the upper and forward part of the frame A. These standards hold each a revolving disk, F, from the edge of which project a number of tines or spurs, $f$, tangentially arranged. By reason of the lateral incline of the standards E the outer and inner disks on each side of the frame are brought near together above the knife, the tines of one disk overlapping those of the other, so that they may not interfere by reason of contact. The upper surface of each of the disks is encircled by a row of studs or teeth, $g$, with which a pawl, $g'$, pivoted to the spindle on which the disk turns, engages to prevent reverse rotation of said disk. H designates platforms, hinged at their outer edges to the sides of the frame A so as to be capable of lateral tilting, for which purpose they are furnished with handles $h$. These platforms are intended for the purpose of receiving the corn-stalks, which, when cut, fall between the rotating disks upon said platforms. The tines take hold of and secure the corn-stalks while the knives are cutting them, and prevent them from falling forward. The weight of the stalks carries them between the inclined disks. I represents horizontal rods reaching from underneath the disks back over the top of the platforms, and are designed for the purpose of guiding the cut stalks directly to the platforms and preventing them from falling on the middle part of the frame or on either side thereof. They have also another function—viz., to compress the corn-stalks into a convenient shape for tying into bundles. The platforms are cleared by merely tilting them. J represents the driver's seat; K, the shafts by which the horse is hitched to the harvester to draw it along; L, a pair of handles reaching from the rear end of the frame, and intended as a means for turning the harvester with ease. The knives D should be vertically adjustable through the medium of an adjusting-screw, $d$, and washers or nuts $d'$, or equivalent devices, so as to cut the stalks at different heights.

I claim as my invention—

The corn-harvester provided with the sickle-sled C and the tilting platforms H, pivoted near their outer edge, and with the pairs of disks F, the disks of each pair being inclined toward each other and to the rear, and having oblique tines, substantially as specified.

In testimony that we claim the above we have hereunto subscribed our names in the presence of two witnesses.

JAMES H. BESANT.
M. B. ATKINSON.

Witnesses:
D. D. KANE,
FRANK B. CURTIS.